United States Patent

[11] 3,582,766

[72] Inventor Keigo Iizuka
  University of Toronto, University Ave.
  Queen's Park, Toronto 5, Ontario, Canada
[21] Appl. No. 876,479
[22] Filed Nov. 13, 1969
[45] Patented June 1, 1971

[54] PASSIVELY CONTROLLED DUPLEXER-COUPLER APPLIED TO A HELICAL ANTENNA FOR USE IN A BOREHOLE PENETRATING AN EARTH FORMATION
9 Claims, 8 Drawing Figs.

[52] U.S. Cl. ................................................ 324/6, 324/5, 324/7
[51] Int. Cl. ................................................ G01v 3/12, G01v 3/18
[50] Field of Search ........................................ 324/6, 5, 7; 343/5, 12

[56] References Cited
UNITED STATES PATENTS
3,357,013 12/1967 Hart ............................ 343/5
3,449,657 6/1969 Fredriksson et al. ......... 324/6

Primary Examiner—Gerard R. Strecker
Attorneys—A. L. Snow, G. F. Magdeburger, F. E. Johnston, R. L. Freeland, Jr. and H. D. Messner ABSTRACT: A passively controlled duplexer-coupler is applied to a helical antenna for use in a borehole penetrating an earth formation to produce cross-polarized transmitting and receiving characteristics.

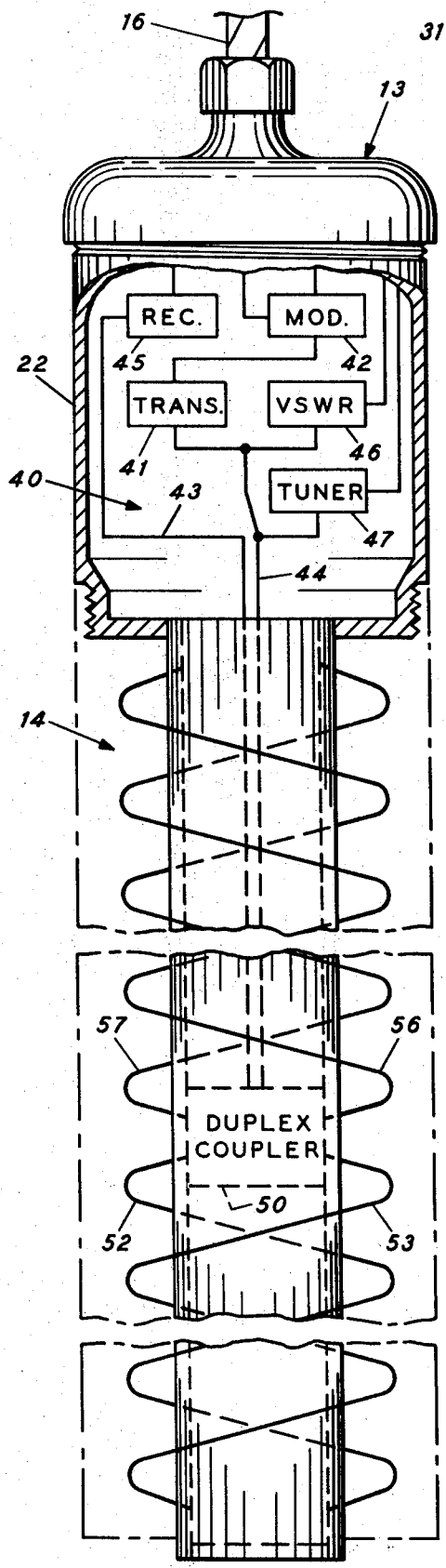
FIG.2A
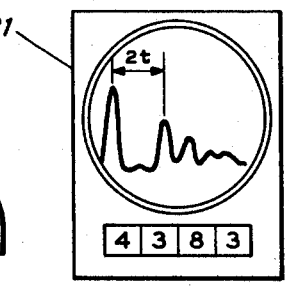
FIG.2B
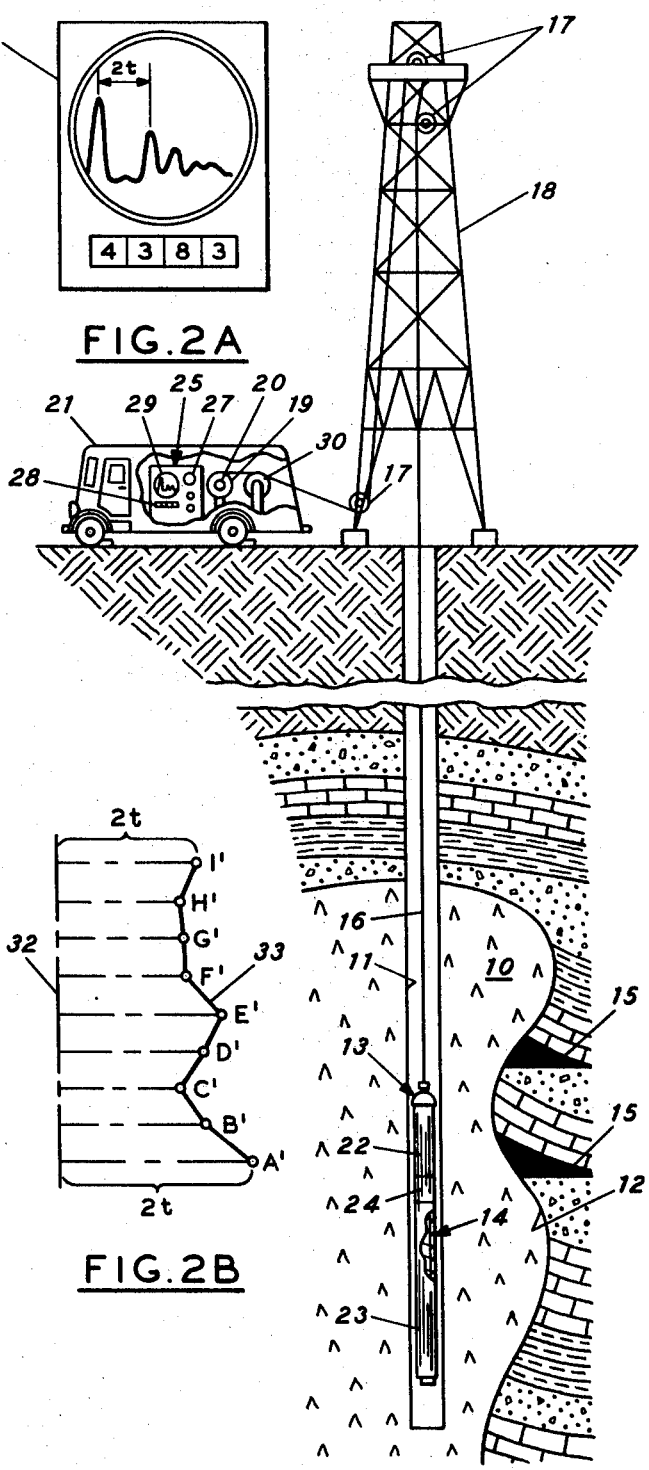
FIG.1
FIG.3
INVENTOR
KEIGO IIZUKA
BY
ATTORNEYS PATENTED JUN 1 1971
3,582,766
SHEET 2 OF 2
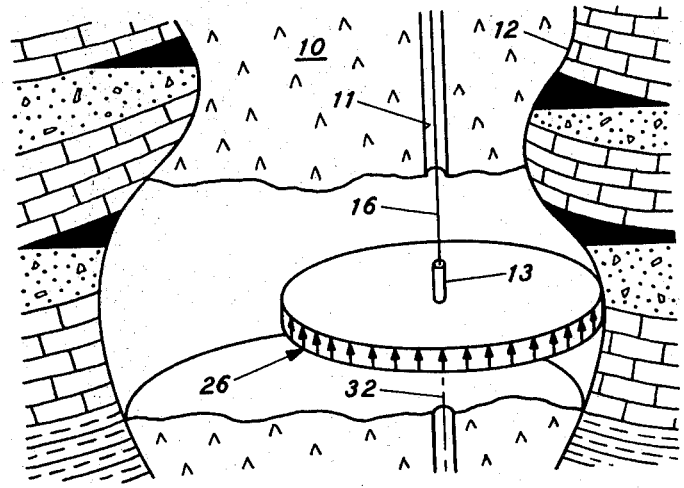
FIG.6
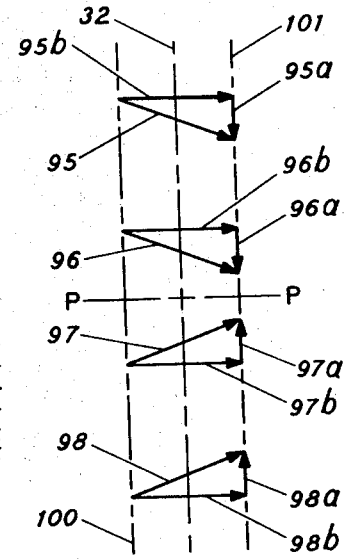
FIG.5
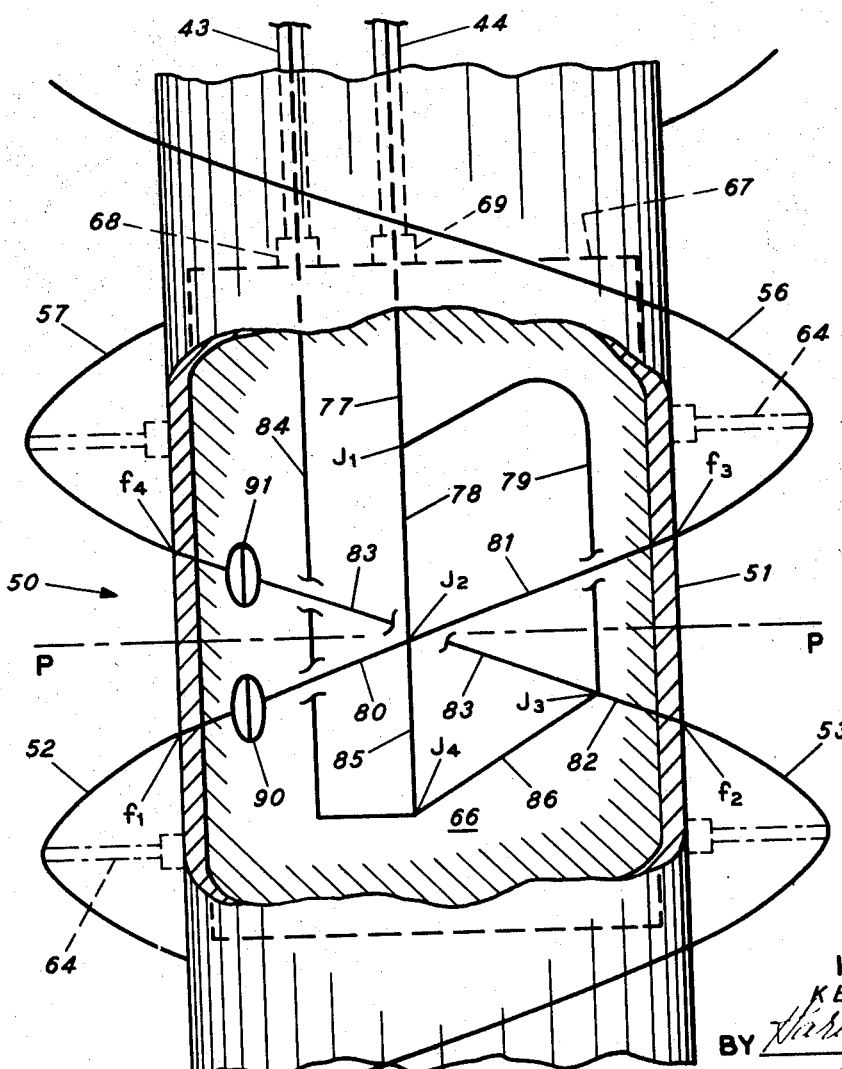
FIG.4
FIG.7
INVENTOR
KEIGO IIZUKA
BY
ATTORNEYS

3,582,766

PASSIVELY CONTROLLED DUPLEXER-COUPLER APPLIED TO A HELICAL ANTENNA FOR USE IN A BOREHOLE PENETRATING AN EARTH FORMATION

RELATED APPLICATION

This application is related to and filed concurrently with SN 876,533 filed Nov. 13, 1969 Entitled "Elements for Steering the Beam of Helical Antenna for Use in A Borehole Penetrating an Earth Formation," inventor: Keigo Iizuka.

This invention relates to the exploration for oil and to the mapping of the sides of a salt body from within a borehole penetrating that body. More particularly, the invention relates to a method and apparatus for sequentially emitting electromagnetic energy from an antenna system within the well bore into the salt dome at a known elevation and receiving reflections of the launched energy from the sides of the dome. The transmission, reflection and reception of the energy are then related to time; and the time of travel of the emitted energy (from the source to the reflector and back) is related to horizontal distance and recorded in accordance with the depth of the antenna below the earth's surface to permit mapping of the interface of the salt dome.

A particular object of the present invention is to provide a method and apparatus for controlling the radiation pattern of a helical antenna housed within a sonde traversing a borehole penetrating the salt dome to facilitate the mapping of the boundary of the dome. The field radiated by the antenna of the present invention is omnidirectional in azimuth with respect to the antenna axis to provide uniform distribution of the radiated energy at all points in circles concentric of the antenna within the borehole (pancake pattern). In the elevational direction, i.e., in planes perpendicular to the axis of the borehole, the field is highly directional. By means of a novel, passively operating downhole duplexer-coupler, the transmitting and receiving characteristics of the helical antenna of the present invention can be automatically modified in a passive sense to provide cross-polarized images of the flanks of the dome. (Polarization relates to the direction of the electric field components of the radiated energy in the principal direction of propagation. Cross-polarization relates to the fact that the direction of the electric field components of the emitted energy from the antenna is at right angles to the maximum sensitivity mode of the antenna in the receiving state.) The antenna can provide, for example, a radiation characteristic such that the energy, as radiated, is polarized in one direction, say vertically, yet without externally actuated controls, the antenna can provide receiving characteristics such that the maximum sensitivity of the antenna is oriented (tuned) to receive reflections in the other polarizing direction, say horizontal. In this way, the antenna system of the present invention can provide cross-polarized images of the flanks of the salt dome. By comparing the cross-polarized images, prospecting for oil or other minerals is considerably facilitated.

The art to which the present invention relates is described in U.S. Pat. No. 3,449,657, assigned to the assignee of the present invention, entitled "Helical Antenna for Irradiating an Earth Formation Penetrated by a Borehole and Method of Forming Same," O. A. Fredriksson, F. Nicholas Fossati, and F. Alexander Roberts, issued June 10, 1969. In that patent, a method and apparatus is described using a helical antenna within a sonde located thousands of feet below the earth's surface for irradiating electromagnetic energy into the salt dome in order to map the distance to the flanks of a salt dome from a borehole penetrating the dome. The principal concern of the aforementioned patent was to provide an improved antenna system which could accomplish emission of electromagnetic radiation which was directional in elevation but omnidirectional in azimuth within the environment of a rather narrow borehole drilled thousands of feet into a salt dome. Specifically, the aforementioned patent described in helical antenna system in which the efficiency is improved by forming the antenna radiating elements of a multiplicity of coextensive pairs of interwound helical conductors. These conductors extend coextensively of a cylindrical mast along the well bore, say for 15 feet or more. In a preferred embodiment, energy is fed to the antenna from a source of energy uphole through a conventional duplexer located in the sonde, say immediately atop the antenna. The duplexer is connected in parallel to a receiver terminal, say also located within the sonde, so as to allow a transmission line means to connect the energization system of the antenna. The efficiency is increased without requiring a corresponding increase in the overall diameter of the antenna, principally by the employment of dual propagating helical conductors wound about a single central cylindrical mast.

The present invention relates to an improvement in the aforementioned helical antenna in which the functions of the duplexer and direct-linkage antenna coupler have been combined into a single, compact duplexer-coupler unit positioned within the cylindrical mast of the antenna. In the present invention, the first and second pairs of helical conductors, each pair being formed of first and second helical elements coextensive with each other, are driven from a midportion of the antenna connected to a source located atop the helical antenna (preferably within the same sonde, however). A feature of the duplexer-coupler of the present invention is the fact that it does not employ active elements either (i) to couple high power energy from the transmitter to the antenna while isolating such energy from the receiver, or (ii) to couple returning echoes of such transmitted energy to the receiver while isolating such signals from the transmitter.

In more detail, the duplexer-coupler includes a series of coaxial conductor extensions ultimately connecting to separate first and second coaxial lead lines; the coaxial lead lines, in turn, connect uphole to the transmitting and receiving circuits of the antenna energization system.

Construction features:

The duplexer-coupler preferably includes a metallic housing, preferably circular in cross section, positioned within the cylindrical mast of the antenna. A series of concavities are formed throughout the housing. Into these concavities are positioned individual segments of the inner conductor of a conventional two-conductor coaxial line. These segments are appropriately joined together at at least four junctions within the duplexer-coupler. It is preferred that surface contact be maintained between the housing and the cylindrical mast. The outer conductors of the first and second coaxial lines, thus, can be connected to the cylindrical mast of the antenna through the surface contact of the mast with the coupler housing. (The inner conductor must, of course, be electrically isolated from the housing, say through use of a series of annular insulating discs positioned within the concavities.) The individual segments of the inner conductor are finally connected to the first and second pairs of helical conductors at four coupling terminals symmetrically disposed about a midplane perpendicular to the axis of the antenna. These four coupling terminals preferably form the corners of an imaginary rectangle, the "long" side connecting terminals providing energy to one of the pair of coextensive helical conductors.

Operational features:

By constructing the segments of the inner conductor so as to have appropriate electrical dimensions (dependent upon the appropriate operating wavelength), the duplexer-coupler can isolate the receiver from the harmful effects of transmitting energy without deteriorating the performance of the antenna in the transmitting mode. The present invention contemplates the use of passive, power-dependent switches positioned in series with particular segments of the inner conductor of the duplexer-coupler of the present invention. The power-dependent switches connect in series with the inner conductor segments connected to two of the four coupling terminals disposed about the midplane of the antenna; i.e., in series with segments connected to the two terminals which lie at the corners of the "short" side of the imaginery rectangle defining the four terminals of the coupler through which the helices are driven. The nonlinear switches passively control the isolation characteristics of the helical conductors in series therewith, depending upon the power content of the incident electromagnetic wave. In the transmitting mode, i.e., high power operation, the nonlinear switches of the duplexer-coupler have limited isolation qualities; energy coupled to the antenna can propagate along the antenna as first and second pairs of electromagnetic waves. This type of operation, as described in detail in the above-cited patent, allows each pair of waves to propagate in an opposite axial direction with respect to the other pair from the midplane of the antenna, but all of the electromagnetic waves interact to generate an omnidirectional radiation pattern in azimuth that can be polarized in a particular direction with respect to the earth's surface, say in a vertical plane. In the receiving mode, the switches deactivate two of the helical conductors because of their isolating characteristics. The remaining helical conductors guide, not four electromagnetic waves as previously described, but only a single pair of electromagnetic waves. These waves, in the receiving mode, preferably propagate between the helical conductors that have been wound in a common direction. Thus, the antenna has maximum sensitivity, in the receiving mode, for the component of the echo signal polarized differently from that of the transmitted signal. I.e., if the transmitted wave is vertically polarized, the antenna, in the receiving mode, has a maximum sensitivity for a horizontally polarized reflected wave. The resulting recorded time plots of the emitted and received energy (indicative of the distance from the borehole to the flank of the salt dome) contains peaks on the time scale marking the reception of cross-polarized energy, and these peaks have particular significance in indicating the geologic nature of the strata from which the energy has been reflected.

Further objects and advantages of the invention will become more apparent from the following detailed descriptions taken in conjunction with the accompanying drawings which form a part of the specification.

In the drawings:

FIG. 1 is a partial section of an earth formation including a salt dome penetrated by a borehole and illustrates a logging sonde and other apparatus for energizing and transporting, depthwise, the sonde in logging the salt dome;

FIG. 2a is a representation of the face of a recording instrument displaying the information to be derived from the logging sonde of FIG. 1;

FIG. 2b is a two-dimensional plot of the near flank of the salt dome of FIG. 1 as a function of depth;

FIG. 3 is an elevational view of the logging sonde of FIG. 1 partially cut away to illustrate a helical antenna adapted to radiate electromagnetic energy for logging the distance to the flank of the dome of FIG. 1;

FIG. 4 is an elevational view, partially cut away, of the helical antenna of FIG. 3, the antenna being adapted to generate vertically polarized electromagnetic radiation using the improved duplexer-coupler of the present invention;

FIG. 5 is a plot of traveling wave phasers of the received energy along sections of the helical antenna of the present invention illustrating how the phasers are resolved to emphasize horizontally polarized electromagnetic radiation;

FIG. 6 is a partial perspective section of the dome of FIG. 1 illustrating the disclike radiation pattern of equiazimuthal, vertically polarized, energy from the helical antenna of FIG. 3 to the flanks of the slat dome; and FIG. 7 is a plot of traveling wave phasers of the emitted energy along sections of the helical antenna of the present invention illustrating how the phasers are resolved to generate vertically polarized electromagnetic radiation.

Referring now to FIG. 1, a section of the salt dome 10 is shown penetrated by a borehole 11 offset from the center of the dome so as to be adjusted to one of its flanks. In order to accurately define the near sidewall of the dome 10 though controlled emission and reception of electromagnetic energy, an exploration sonde 13 incorporating an electromagnetic helical antenna, generally indicated at 14, is transported along the borehole so as to be placed adjacent to different horizontal sections of the dome. The purpose of mapping the near side of the salt dome-sedimentary interface 12 is to identify those areas where oil deposits 15 are most likely to be found adjacent the sidewall of the dome.

To provide movement of the sonde 13 through the borehole 11, a logging cable 16 is connected through sheaves 17 on derrick 18 to cable drum 19. Motor 20 powers drum 19 on hoist truck 21 to raise and lower the sonde.

As the borehole 11 may be filled with a dense drilling fluid to prevent intrusion of the earth formation into the borehole, the sonde 13 must be fluidtight at the mating joints of the upper housing 22 with lower housing 23 supporting the helical antenna 14. The upper housing 22 is connected to the lower housing 23 by union collar 24 as indicated.

Located within truck 21 is a console 25 containing a power source and associated coupling circuitry suitable for feeding timing signals along logging cable 16 to the sonde 13, as well as indicators for the source and coupling circuitry. Console 25 may also include surface recording equipment including at least three indicators: one for impedance match, indicator 27; another for depth, indicator 28; and another for distance, indicator 29. The impedance match displayed on indicator 27 relates to the power transfer between the helical antenna 14 and coupling circuitry within the sonde 13 as a function of their respective impedances, and the matching is performed downhole during operation of the antenna. Depth indicator 28 shows the mapping depth of the antenna in the borehole 11 and is measured by pulley 30. The distance from the borehole to the sidewall of the near side of the salt dome at each mapping depth is a function of the time between transmission and reception of the electromagnetic energy by the antenna and is displayed on indicator 29. The information on the indicator 29 and the depth indicator 28 can be simultaneously recorded using a camera to produce a photographic plate of the type indicated at 31 in FIG. 2a. Plate 31 indicates the two-way travel time (2T) for the emitted signals, and a series of these photographs may be reduced to a two-dimensional plot, such as shown in FIG. 2b, in which the location of the near wall of the salt body relative to antenna axis 32 is represented by line 33 connecting mapped points A , B', C', D', E', etc.

Reference should now be had to FIG. 3. This figure illustrates energization section 40 for the helical antenna 14 for utilizing the timing signals fed from control console 25 at the earth's surface. As indicated, section 40 includes a transmitter 41 which is periodically energized through modulator (pulser) 42 so as to generate electromagnetic pulses of high power and relatively short duration. VSWR coupler 46 is connected to coaxial line 44 so as to sense the energy transmitted from the transmitter 41 to the antenna 14. The VSWR coupler 46 samples the energy to indicate the power transferred to the antenna from the section 40.

The maximum power transfer from the transmitter to the antenna can be achieved in the present invention through a stub tuner 47 connected in parallel with coupler 46. The tuner 47 is adjustable by circuitry within the console 25 as the console operator monitors the response of coupler 46 by means of detector 27 of the console (FIG. 1). However, since antenna 14 in FIG. 3 is used for both transmitting and receiving electromagnetic energy, the antenna must be capable of being alternately connected to the transmitter 41 and to receiver 45 during the respective transmitting and receiving cycles. Isolation of the receiver 45 from the transmitter 41 during the transmitting cycle must also be achieved. In the present invention, duplexing operations are performed, not within a separate duplexer within section 40, but by means of combined, unitary duplexer-coupler 50 positioned within the helical antenna 14 positioned below section 40.

FIG. 4 illustrates the duplexer-coupler 50 of the present invention in more detail. It is contemplated that the duplexer-coupler 50 will be constructed of laminated, flat metallic plates fitted together along longitudinal broad sides (flats) to form a housing 66. End wall 67 of the housing is fitted with coaxial connectors 68 and 69 connecting to coaxial lines 43 and 44, respectively. As shown, the housing 66 is positioned in surface contact with a sidewall of central mast 51. The outer conductors of the lines 43 and 44 connect to the mast 51 by grounding them at their coupling points to the connectors 68 and 69. Concavities (not shown) at the intersecting line of the adjacent broad sides of the metallic plates (each concavity, say, being semicircular in cross section) are provided by appropriate milling or machining prior to assembly. These concavities serve as passageways for energy fed between the individual split segments of the inner conductor of the lines 43 and 44 (these segments supported by annular insulating discs within the concavities) and the housing 66. After passage through the duplexer-coupler 50, the energy is coupled in turn between the helical conductors 52, 53 and 56, 57 as at the feed points $f_1, f_2, f_3$ and $f_4$, and the central mast 51.

Mechanical arrangement of the inner conductor segments within the concavities of the duplexer-coupler 50 to provide duplexing operations, forms an important aspect of the present invention. As shown, within the duplexer-coupler 50, a series of individual split conductor segments extend from respective inner conductors of the input lines 43 and 44. These segments are joined together at at least four junctions $j_1$, $j_2$, $j_3$ and $j_4$ to perform conventional duplexing operations in the antenna system without the need of active control elements, while the antenna system is located thousands of feet below the earth's surface. In particular, lead input segment 77 is seen to split at junction $j_1$ to parallel conductor segments 78 and 79. Conductor 78 is, in turn, split at junction $j_2$ into two transversely extending conducting segments 80 and 81 which connect, at feed points $f_1$ and $f_3$, to helical conductors 52 and 56. Segment 79 is arcuately shaped and extends from its junction point $j_1$ in an initial transverse direction and then is curved and follows a more horizontal direction until it reaches junction point $j_3$ just beyond the midplane $p-p$ of the antenna system. Below the midplane $p-p$, the segment is, again, divided into two transversely extending segments 82 and 83. Segments 82 and 83 connect, at feed points $f_2$ and $f_4$, to the helical conductors 53 and 57. As viewed in FIG. 4, the feed points $f_1, f_2, f_3$ and $f_4$ are positioned at symmetrical locations about midplane $p-p$. When so viewed in elevation, these feed points are seen to define the corners of an imaginery rectangle, the "long" sides of the rectangle having corners identified with the feed points $f_1$ and $f_2$ and with feed points $f_3$ and $f_4$, respectively.

Energizing the antenna with energy of the correct polarity depends upon the electrical line length of the conductor segments 78 relative to that of segment 79. If helical conductor 52 is fed at $f_1$ 180° out of phase with respect to helical conductor 53 at $f_2$ and, similarly, if helical conductor 56 is fed 180° out of phase with conductor 57, the result: As explained in detail in the aforementioned patent of O. A. Fredriksson, F. N. Fossati and F. A. Roberts, first and second pairs of electromagnetic waves will propagate along the antenna and radiate (in omnidirectional patterns in azimuth) into the adjacent earth formation. Such radiation is vertically polarized with respect to the earh's surface if the phase at $f_1$ is 180° out of phase with respect to that at $f_4$.

Segments 78 and 79 are constructed to have difference in length equal to $M\lambda_f/2$ where M is any odd number and $\lambda_f$ is the operating wavelength of electromagnetic energy in the coaxial line to achieve correct feeding conditions. When M is odd, the direction of polarization is vertical; when M is even, the polarization direction is horizontal. For purposes of analysis, it is assumed that the transverse segments 80, 81, 82 and 83 are approximately the same length. If segment 78 has a dimension equal to $\frac{1}{4}\lambda_f$ (between junction points $j_1$ and $j_2$), for example, while segment 79 has an electrical length (between junction points $j_1$ and $j_3$) equal to $\frac{3}{4}\lambda_f$, then the differential distance is seen to be equal to $\lambda_f/2$, assuming the transverse segments 80, 81, 82 and 83 are of approximately the same total length. In that way, correct feeding conditions (energy at $f_1$ is out of phase with energy at $f_2$, and likewise for the energy at $f_3$ and $f_4$) will exist for coextensive helical conductors 52, 53 and 56, 57.

Isolation characteristics:

The isolation characteristics of the duplexer-coupler 50, in the transmission mode, become evident by noting that the transmitted energy entering the coupler via segment 77 is split at junction $j_1$ and arrives at junction $j_4$ from two different paths: (i) path $j_1$-$j_3$-$j_4$ extends through segments 79 and 86 and (ii) path $j_1$-$j_2$-$j_4$ passes along segments 78 and 85. Since there is a differential in the distances in (i) and (ii), above, of $M\lambda_f/2$, the transmitting energy is seen to be cancelled at junction point $j_4$, assuming that the respective lengths of sections 84, 85 are identical. In this way, the receiver uphole from the antenna is protected, in the transmission mode, from being damaged by the high power transmitting energy.

Exterior of the duplexer-coupler 50, the helical conductors 52, 53 and 56, 57 are insulated from the central cylindrical mast 51 by a series of radially extending posts 64. An outer insulating covering, not shown, is added about the entire antenna to insulate the helical conductors 52, 53 and 56, 57 from the walls of the logging sonde. As previously mentioned, interior of the duplexer-coupler 50, the segments of the inner conductor are insulated from the housing 66 by a series of annular insulating discs in contact with the sidewall of each concavity, such discs having central openings through which the segments of the inner conductor extend, in the manner taught in the aforementioned patent of L. A. Fredriksson, F. N. Fossati and F. A. Roberts.

The duplexer-coupler 50 of the present invention contemplates—in a second operating mode—connection of the antenna elements with the receiver uphole of the antenna. To provide proper coupling characteristics, an output conductor segment 84 is seen to be an extension of the inner conductor of coaxial line 43 and is connected thereto through coaxial connector 68. Segment 84 extends from the end wall 67 of the housing 66 along a path parallel to that of conductor 77. At junction $j_4$, segment 84 splits into and forms the separate conductors 85 and 86, previously described. Segments 85 and 86 are of equal length, say equal to $M\frac{1}{4}\lambda_f$ where M and $\lambda_f$ are as previously defined. Segment 85 extends from junction $j_4$ and connects, as previously indicated, to segments 78, 80 and 81 at junction point $j_2$; similarly, segment 86 extends between junction $j_4$ and junction $j_3$, the latter junction marking the intersection of segments 79, 82 and 83.

In the receiving mode, the present invention contemplates the use of passive power-dependent switches 90 and 91 which, as indicated in FIG. 4, are positioned in series with the inner conductor segments 80 and 83, respectively, adjacent to feed points $f_1$ and $f_4$. The purpose of switches 90 and 91, in the receiving mode of the present invention, is to isolate the helical conductors 52 and 57 relative to the receiving circuitry of the antenna system and, in that way, prevent coupling of the traveling wave current from the helical conductors 52 and 57 at feed points $f_1$ and $f_4$ to the uphole receiving circuit. For purposes of identification, it is seen that points $f_1$ and $f_4$ lie at the corners of the "short" side of the imaginary rectangle previously described as having its four corners located coincident with feed points $f_1, f_2, f_3$ and $f_4$.

Switches 90 and 91 are preferably conventional power dependent devices passively operating to allow transmission of the energy of the helical conductors 52 and 57 above a threshold power level but in the receiving mode to isolate these conductors from other elements of the duplexer-coupler 50 as the antenna system is operated in the receiving mode. Accordingly, after switches 90 and 91 isolate the helical conductors 52 and 57, the remaining helical conductors 53 and 56 (extending in opposite axial directions relative to midplane $p-p$ but helically winding in the same angular direction) guide, not four electromagnetic waves as in the transmitting mode, but only a single pair of electromagnetic waves. These waves propagate in a helical fashion between the helical conductors 53 and 56 and the central mast 51.

The fact that the antenna is sensitive only to the horizontally polarized wave—in the receiving mode—can be best explained in conjunction with FIG. 5 using the reciprocity theorem of electromagnetic theory. The explanation assumes, on the one hand, that the antenna is driven at junction $j_4$ with both switches 90 nd 91 open, circuited and, on the other hand, attempts to determine the current at junction $j_4$ when the antenna is used as a receiving antenna. In FIG. 5, the arrows 95, 96, 97 and 98 indicate that the instantaneous traveling wave current (found on equalized incremental lengths of tee helical conductors 53 and 56 at a common means azimuthal direction with respect to central axis 32) is equal in magnitude under the aforementioned assumptions, i.e., with the antenna being driven at junction $j_4$, and the switches 90 and 91 open circuited. Incremental conductor length is defined, for explanatory purposes, by an imaginary geometrical figure which extends the length of the antenna and has a wedge-shaped cross section, one corner of which being located on the antenna axis 32 and the other two corners of which being located on parallel lines 100 and 101. (The lines 100 and 101 are radially spaced from but parallel to axis 32.) The vectors 95, 96, 97 and 98 can be resolved into component vectors—i.e., the arrows representing the current may be resolved into vertical vectors 95a, 96a, 97a and 98a, which cancel, and into horizontal vectors 95b, 96b, 97b and 98b, which add. It is evident from the above that due to the reciprocity theorem the antenna of the present invention, in the receiving mode, has maximum sensitivity for a horizontally polarized reflected wave. I.e., the energy of the generated wave is assumed to be vertically polarized, then the duplexer-coupler 50 of the present invention provides for an antenna having sensitivity that is maximum for reflected signals of the horizontally polarized mode, as depicted in FIG. 5. Thus, characteristics of the cross-polarization are provided by the antenna of the present invention.

Referring again to FIG. 4, it should be noted that, in the receiving mode, the duplexer-coupler 50 prevents transmittal of the received signals to the transmitter uphole from the antenna. Even though traveling wave current on the helical conductors 53 and 56 are in phase at the junction point $j_4$, they also cancel at junction point $j_1$ because of the constructional features of the duplexer-coupler 50. It is seen in FIG. 4 that the traveling wave current along the helical conductor 56 is coupled to the duplexer-coupler 50 at the feed point $f_3$. The current, then, travels along segment 81 to junction $j_2$, then along parallel segments 78 and 85 to the junctions $j_1$ and $j_4$, respectively. Similarly, current traveling along helical conductor 53 make coupling contact with the duplexer-coupler 50 at the feed point $f_2$ and thence travel along segment 82 therein to junction $j_3$. At junction $j_3$ the current then pass along parallel segment 79 to junction $j_1$. It can be shown that if the relative differential electrical length between (i) path $j_2$-$j_1$ along segment 78 and (ii) path $j_3$-$j_1$ along segment 79, is equal to $M\lambda_f/2$ where M and $\lambda_f$ are as previously described, then the energy at point $j_1$, in the receiving mode, will cancel. However, energy coupled to the junction point $j_4$ and segment 84 and hence from output line 43 to the receiver, remains unaffected by the cancellation of energy at junction $j_1$.

Interpretation:

If the resulting recorded time plots of the emitted and received energy (indicative of the distance from the borehole to the flank of the salt dome as by measuring the two-way travel time of the energy within the dome) contain peaks on the time scale, it is evident that these peaks mark the reception of cross-polarized energy. Moreover, these peaks have particular interpretative significance when correlated with like polarized time-plots (from common reflectors). Result: discovery of the geologic nature of the strata from which the energy has been reflected, is facilitated.

Generalized Helical Antenna Operation Characteristics (Transmitting Mode):

Referring again to FIG. 3, during the transmission mode, the helical conductors 52, 53 and 56, 57 may be fundamentally thought of, for purposes of illustration, as guiding the first and second pairs of electromagnetic waves from the midplane p-p of the duplexer-coupler 50 to the respective ends of the antenna. As indicated in FIG. 3, the helical conductors 52, 53 and 56, 57 are radially spaced from the central mast 51 by a constant radial distance and define a constant pitch angle. Also, each conductor winds in the same circumferential direction about mast 51. Thus, the circumferential turn length of the helical conductors is constant along the antenna. In this regard, common turn length of N$\lambda$ is preferred, where N is an integer (preferably one) and $\lambda$ is the operating wavelength of electromagnetic energy in the salt dome. At the midplane p-p it has been previously indicated that the duplexer-coupler 50 of the present invention connects to the helical conductors so as to properly drive the antenna. As previously indicated, symmetry in the excitation of the antenna at the feed points $f_1, f_2, f_3$ and $f_4$ as well as other design factors of the antenna depicted in FIG. 3, permits interaction between the propagating first and second pairs of electromagnetic waves to establish vertical polarization of the resulting radiated field.

Electromagnetic Characteristics of the First and Second Pairs of Waves:

Each pair of waves propagate along the antenna from midplane of the duplexer-coupler 50 to the ends of the antenna guided by the helical conductors 52, 53 and 56, 57. During such propagation, the electromagnetic wave guided by one of a pair of conductors is identical with that of the wave guided by the other of the same pair of conductors, at any azimuthal angle. Each wave thus contributes to the intensity of the resulting radiated field.

Polarization Characteristics:

Polarization of the radiated energy in the transmitted mode relates to the direction of the electric field components of the radiated field in the principal direction of propagation. As illustrated in FIG. 6, the radiated energy (from a broadside radiating, helical antenna within sonde 13) is in the form of an expanding solid of revolution having uniform radiation in planes transverse to the axis 32 of the antenna. A small section of the energy (called a wave front) is generally indicated at 26. The wave front 26 is located perpendicular to the direction of travel of the energy as the energy propagates from the borehole 11 in radial directions through salt dome 10. The wave front ultimately encounters the interface 12 of the salt body and the surrounding formation, and a portion of the energy is reflected. The electric field components at the wave front are seen to be vertically polarized.

FIG. 7 is a plot of the traveling wave current in the transmitting mode along the helical conductors of the antenna of FIG. 3. The direction of the electric field component of the radiated energy is parallel to the directions of the incremental segments of the helical conductors 52, 53 and 56, 57; and the phase of the electric field is determined by the distance between the current element and the point of observation in the field. Further, the magnitude of the electric field component is proportional to that of the current along the incremental segments of the helical conductors, and can be calculated by vectorial summation of the contribution of all current elements. As indicated in FIG. 7, the traveling wave current represented by arrows 58, 59, 60 and 61 may be resolved into vertical field vectors 58b, 59b, 60b and 61b (algebraically additive) and into horizontally aligned electric field vectors 58a, 59a, 60a and 61a (algebraically cancellable) to generate vertically polarized electromagnetic radiation.

While certain preferred embodiments of the invention have been specifically disclosed, it should be understood that the invention is not limited thereto as many variations will be readily apparent to those skilled in the art. With regard to the operating frequency of this system, loss-tangent measurements on samples of halite taken from salt domes indicate rather low losses for electromagnetic energies in the frequency range of $10^6$ to $10^{11}$ Hertz. Above this range losses become excessive; below this range the power of resolution of reflection signals decreases.

I claim:

1. In a subsurface earth formation exploration tool for logging an earth formation penetrated by a borehole to approximate the distance to an electromagnetic discontinuity in said formation from said borehole, a helical antenna for irradiating said formation with electromagnetic radiation uniformly and transverse to the axis of said borehole in one polarizing mode and receiving, with maximum receiving sensitivity, reflections of said radiation in another polarizing mode other than that of said one polarizing mode, comprising:
a. a central conductor element axially elongated along the axis of said borehole;
b. first and second pairs of helically conducting elements wound axially along and radially spaced outwardly from said central element;
c. each of said first and second pairs of helical conducting elements defining a coextensive pair of helical elements beginning substantially at the midplane of said cylindrical element, and each helical element of said coextensive pair winding in the same circumferential direction about said central conductor toward the same end of said central element as the other of said coextensive pair; and
d. duplexer-coupler means positioned adjacent to the midplane of said central element interior of said central element for coupling energy between said central element and said first and second pairs of helical conducting elements, the feed points for each element being selected, in the transmitting mode, to produce first and second pairs of electromagnetic waves, one pair of said pairs of waves propagating in phase in an opposite axial direction from and radiating in phase with said other pair of waves in planes substantially transverse to the axis of said borehole to produce a uniform resultant transverse radiation pattern in the formation penetrated by said borehole, said radiation being in a first polarizing mode,
said duplexer-coupler means including power-dependent switch means passively operative, in the receiving mode, to deactivate one helical element of each coextensive pair of helical elements so as to support the propagation of first and second reflected electromagnetic waves therealong whereby antenna sensitivity, in the receiving mode, for receiving reflected radiation is maximum for reflected radiation of another polarizing mode as that produced in said transmitting mode.

2. The helical antenna of claim 1 which (i) said first and second pairs of electromagnetic waves, in the transmitting mode, interact as a function of axial position along said antenna measured with respect to said midplane of said central element so as to generate vertically polarized radiation, and (ii) further, said power-dependent switch means passively operate, in the receiving mode, to deactivate said one helical element of said coextensive pair of helical elements so as to generate an antenna receiving sensitivity maximum for horizontally polarized, reflected radiation.

3. The antenna of claim 2 in which said duplexer-coupler means includes a series of segmented conductor means positioned interior of said central element, said series of segmented conductor means joined together in parallel at at least four separate junctions terminating in at least four terminal segments connected to the four feed points of said first and second pairs of helical elements,
one of said series of segmented conductor means capable of being connected in series with a source of electromagnetic energy, uphole from the antenna; another of said series of segmented conductor means capable of being connected in series with a receiving means uphole from the antenna,
remaining segments of said segmented conductor means having selected electrical lengths formed between said junctions such as to couple, in the transmitting mode, electromagnetic energy from said one segment of said series of segmented conductor means to at least said four terminal segments so as to generate said first and second pairs of electromagnetic waves along said antenna, while simultaneously isolating said other segment of said series of segmented conductor means from the damaging effects of said transmitted energy.

4. The helical antenna of claim 3 in which said four feed points for said first and second pairs of helical elements lie in a common plane and define corners of an imaginary, axially extending rectangle, the diagonally located feed points thereof forming first and second sets of feed points for said first and second pairs of helical elements,
said series of segmented conductor means having selected electrical lengths, at least as measured between said four junctions, so as to couple, in opposite phase, energy at said first set of feed points relative to said second set of feed points.

5. The helical antenna of claim 4 in which said power-dependent switch means passively operated, in the receiving mode, to deactivate one helical element of each first and second pair of helical elements, are positioned in series with two of said terminal segments of said series of segmented conductor means, said two terminal segments being those segments which terminate in feed points which lie along the short side of said imaginary rectangle defining said feed points for said first and second pairs of helical elements.

6. The method of irradiating an earth formation penetrated by a borehole with electromagnetic energy in one polarizing mode and receiving, with maximum sensitivity, reflections of said energy in another polarizing mode to that generated, whereby the distance to an electromagnetic discontinuity in said formation from said borehole can be approximated and the texture of said discontinuity identified, comprising the steps of:
in a transmitting mode, coupling electromagnetic energy from a source of energy to first and second pairs of helical conductors and a central cylindrical element coextensive with said helical conductors at a series of feed points near a midportion of said cylindrical element to propagate first and second pairs of electromagnetic waves along and radiating from said conductors into said formation, each of said waves being specified in terms of voltages existing between the helical conductors and the central cylindrical element and of currents carried by the helical conducting elements and by said cylindrical element;
directing said first pair of electromagnetic waves in helical paths of common angular direction about said cylindrical element from said midportion of said cylindrical element toward a remote end of said cylindrical element;
directing said second pair of electromagnetic waves in helical paths in an angular direction common to said first pair of waves about said cylindrical element from said midportion of said cylindrical element in an axial direction opposed to that of said first pair of waves, each of said first and second pairs of electromagnetic waves having equal phases as a linear function of the position of said each pair of waves along said conductors in a direction away from said coupling points so as to increase radiation per unit length along said antenna; and
controlling the phase of current of said first and second pairs of electromagnetic waves as a function of the symmetrical position of said waves as measured along said central element in opposite but equal axial directions from said coupling points to radiate electromagnetic radiation polarized in a first polarizing mode into said formation,
in a receiving mode, passively decoupling one helical conductor of each of said first and second pairs of helical conductors based on the power level of the received energy so as to maximize receiving sensitivity of the antenna to energy having another polarizing mode as that of said radiated energy, whereby cross-polarized signals from discontinuities within said formation can be indicated and displayed.

7. A method as in claim 6 in which (i) the step of controlling the phase of the current of said first and second pairs of electromagnetic waves includes cancelling horizontal components of said current as a function of the symmetrical position of said first pair of waves relative to said second pair of waves as measured along said antenna in opposite but equal axial directions from said midportion of said central element so as to cause radiation of vertically polarized energy into said formation, said cancelled components of said current being located in planes perpendicular to the longitudinal axis of said central element and, further, (ii) the step of decoupling said one helical conductor of said first and second pairs of helical conductors, in said receiving mode, provides a receiving sensitivity that is maximum for horizontally polarized reflections.

8. The method as in claim 6 in which (i) the step of controlling the phase of the current of said first and second pairs of electromagnetic waves includes cancelling vertical components of the current as a function of symmetrical position of said waves in opposite but equal distances from said midportion of said central element so as to cause radiation of horizontally polarized energy into said formation, said cancelled components of the current being located in planes parallel to the longitudinal axis of said central element, and, further, (ii) the step of decoupling one helical conductor of each of said first and second pairs of helical conductors, in the receiving mode, provides a receiving sensitivity that is maximum for vertically polarized reflections.

9. A method in accordance with claim 6 with the additional step of comparing said cross-polarized signals with like-polarized generated and received signals from common discontinuities so as to indicate the texture of said discontinuity.